US012613876B2

(12) United States Patent
Schyma

(10) Patent No.: US 12,613,876 B2
(45) Date of Patent: Apr. 28, 2026

(54) DATABASE VALUE EXPLORATION SYSTEM

(71) Applicant: SAP SE, Walldorf (DE)

(72) Inventor: Jens Schyma, Forst-BW (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/495,052

(22) Filed: Oct. 26, 2023

(65) Prior Publication Data

US 2025/0139097 A1     May 1, 2025

(51) Int. Cl.
| | |
|---|---|
| *G06F 16/24* | (2019.01) |
| *G06F 3/04842* | (2022.01) |
| *G06F 16/2455* | (2019.01) |
| *G06F 16/248* | (2019.01) |
| *G06F 16/26* | (2019.01) |

(52) U.S. Cl.
CPC ........ *G06F 16/248* (2019.01); *G06F 3/04842* (2013.01); *G06F 16/24553* (2019.01); *G06F 16/26* (2019.01)

(58) Field of Classification Search
CPC ... G06F 16/24553; G06F 16/248; G06F 16/26
See application file for complete search history.

(56) References Cited

U.S. PATENT DOCUMENTS

| | | | | |
|---|---|---|---|---|
| 2006/0100974 A1* | 5/2006 | Dieberger | ............. | G06F 16/284 |
| 2007/0050379 A1* | 3/2007 | Day | ..................... | G06F 16/248 |
| 2014/0160131 A1* | 6/2014 | Azizi | .................. | G06F 3/04842 |
| | | | | 345/440 |
| 2016/0098464 A1* | 4/2016 | Burke | ................. | G06F 3/04847 |
| | | | | 715/771 |
| 2017/0212942 A1* | 7/2017 | Boileau | ................... | G06F 16/26 |
| 2018/0181657 A1* | 6/2018 | Giardina | ............... | G06F 16/242 |
| 2024/0171483 A1* | 5/2024 | Trivedi | .................. | H04L 41/22 |

* cited by examiner

*Primary Examiner* — Brittany N Allen
(74) *Attorney, Agent, or Firm* — SCHWEGMAN LUNDBERG & WOESSNER, P.A.

(57) ABSTRACT

A computer-implemented method may comprise receiving a first search value and generating a first set of search results based on a first search of database tables for the first search value. The first set of search results may identify each row of each database table that has a corresponding cell that includes the first search value. Each row of one of the database tables that is identified in the first set of search results may be displayed along with a corresponding cell value that is stored in each one of the cells of the row. A second search value defined by a user selection of one of the displayed cell values may be received, and, in response to receiving the second search value, a second set of search results may be generated based on a second search search of the database tables for the second search value.

20 Claims, 10 Drawing Sheets

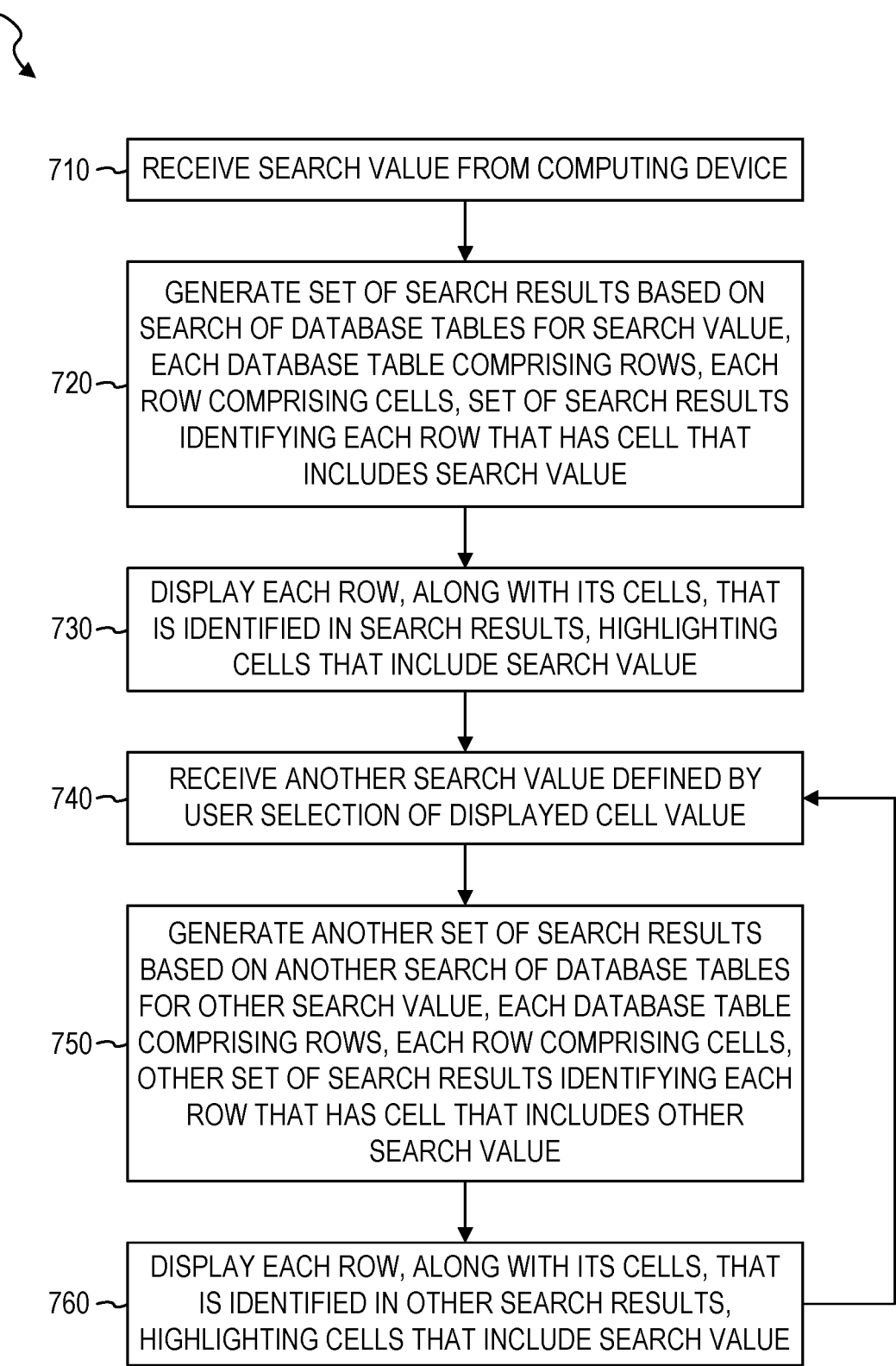

700

710 — RECEIVE SEARCH VALUE FROM COMPUTING DEVICE

720 — GENERATE SET OF SEARCH RESULTS BASED ON SEARCH OF DATABASE TABLES FOR SEARCH VALUE, EACH DATABASE TABLE COMPRISING ROWS, EACH ROW COMPRISING CELLS, SET OF SEARCH RESULTS IDENTIFYING EACH ROW THAT HAS CELL THAT INCLUDES SEARCH VALUE

730 — DISPLAY EACH ROW, ALONG WITH ITS CELLS, THAT IS IDENTIFIED IN SEARCH RESULTS, HIGHLIGHTING CELLS THAT INCLUDE SEARCH VALUE

740 — RECEIVE ANOTHER SEARCH VALUE DEFINED BY USER SELECTION OF DISPLAYED CELL VALUE

750 — GENERATE ANOTHER SET OF SEARCH RESULTS BASED ON ANOTHER SEARCH OF DATABASE TABLES FOR OTHER SEARCH VALUE, EACH DATABASE TABLE COMPRISING ROWS, EACH ROW COMPRISING CELLS, OTHER SET OF SEARCH RESULTS IDENTIFYING EACH ROW THAT HAS CELL THAT INCLUDES OTHER SEARCH VALUE

760 — DISPLAY EACH ROW, ALONG WITH ITS CELLS, THAT IS IDENTIFIED IN OTHER SEARCH RESULTS, HIGHLIGHTING CELLS THAT INCLUDE SEARCH VALUE

FIG. 7

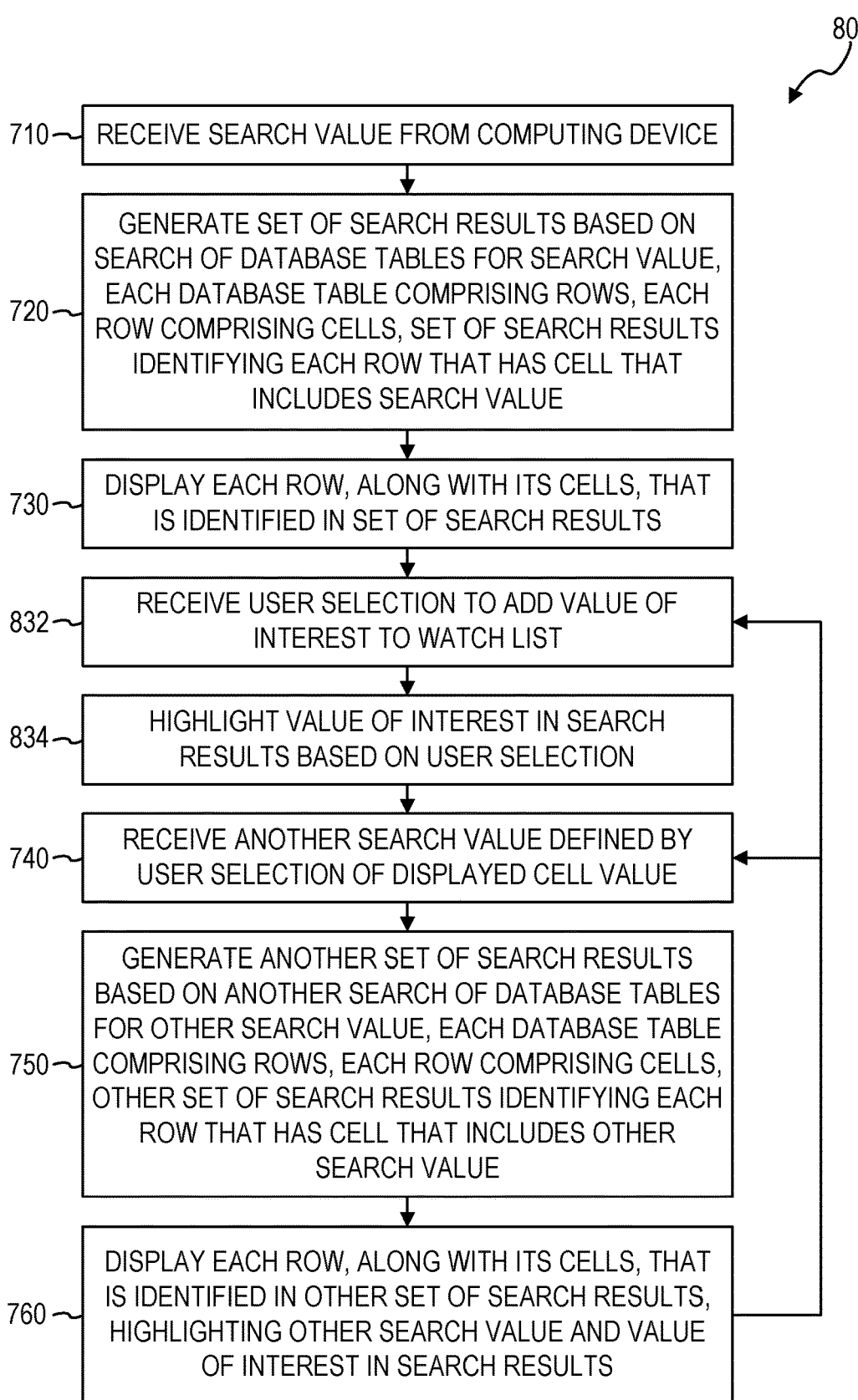

800

710 — RECEIVE SEARCH VALUE FROM COMPUTING DEVICE

720 — GENERATE SET OF SEARCH RESULTS BASED ON SEARCH OF DATABASE TABLES FOR SEARCH VALUE, EACH DATABASE TABLE COMPRISING ROWS, EACH ROW COMPRISING CELLS, SET OF SEARCH RESULTS IDENTIFYING EACH ROW THAT HAS CELL THAT INCLUDES SEARCH VALUE

730 — DISPLAY EACH ROW, ALONG WITH ITS CELLS, THAT IS IDENTIFIED IN SET OF SEARCH RESULTS

832 — RECEIVE USER SELECTION TO ADD VALUE OF INTEREST TO WATCH LIST

834 — HIGHLIGHT VALUE OF INTEREST IN SEARCH RESULTS BASED ON USER SELECTION

740 — RECEIVE ANOTHER SEARCH VALUE DEFINED BY USER SELECTION OF DISPLAYED CELL VALUE

750 — GENERATE ANOTHER SET OF SEARCH RESULTS BASED ON ANOTHER SEARCH OF DATABASE TABLES FOR OTHER SEARCH VALUE, EACH DATABASE TABLE COMPRISING ROWS, EACH ROW COMPRISING CELLS, OTHER SET OF SEARCH RESULTS IDENTIFYING EACH ROW THAT HAS CELL THAT INCLUDES OTHER SEARCH VALUE

760 — DISPLAY EACH ROW, ALONG WITH ITS CELLS, THAT IS IDENTIFIED IN OTHER SET OF SEARCH RESULTS, HIGHLIGHTING OTHER SEARCH VALUE AND VALUE OF INTEREST IN SEARCH RESULTS

*FIG. 8*

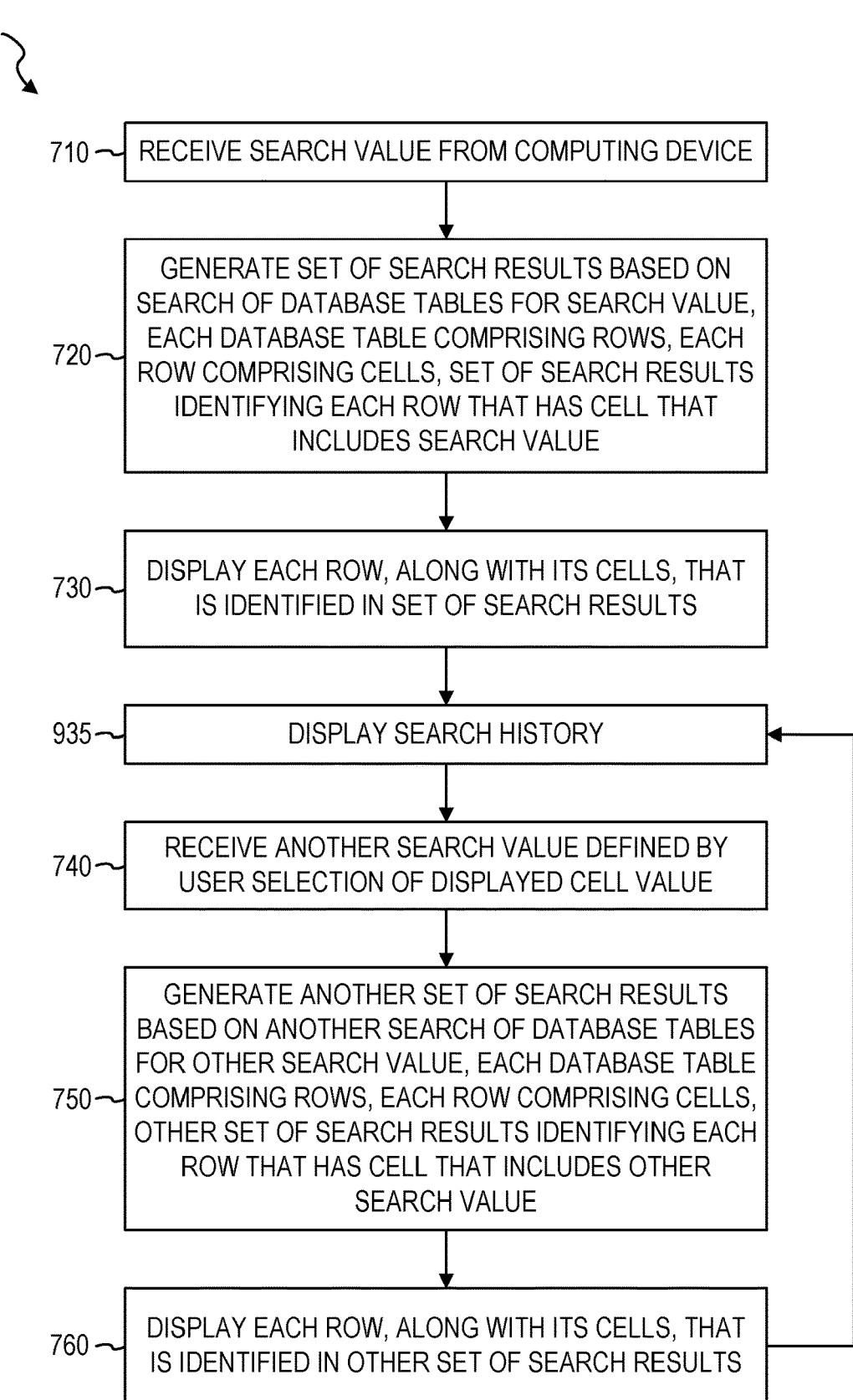

700

710 — RECEIVE SEARCH VALUE FROM COMPUTING DEVICE

720 — GENERATE SET OF SEARCH RESULTS BASED ON SEARCH OF DATABASE TABLES FOR SEARCH VALUE, EACH DATABASE TABLE COMPRISING ROWS, EACH ROW COMPRISING CELLS, SET OF SEARCH RESULTS IDENTIFYING EACH ROW THAT HAS CELL THAT INCLUDES SEARCH VALUE

730 — DISPLAY EACH ROW, ALONG WITH ITS CELLS, THAT IS IDENTIFIED IN SET OF SEARCH RESULTS

935 — DISPLAY SEARCH HISTORY

740 — RECEIVE ANOTHER SEARCH VALUE DEFINED BY USER SELECTION OF DISPLAYED CELL VALUE

750 — GENERATE ANOTHER SET OF SEARCH RESULTS BASED ON ANOTHER SEARCH OF DATABASE TABLES FOR OTHER SEARCH VALUE, EACH DATABASE TABLE COMPRISING ROWS, EACH ROW COMPRISING CELLS, OTHER SET OF SEARCH RESULTS IDENTIFYING EACH ROW THAT HAS CELL THAT INCLUDES OTHER SEARCH VALUE

760 — DISPLAY EACH ROW, ALONG WITH ITS CELLS, THAT IS IDENTIFIED IN OTHER SET OF SEARCH RESULTS

FIG. 9

DATABASE VALUE EXPLORATION SYSTEM

BACKGROUND

Software developers and support engineers need to explore database content for a variety of reasons. For example, they may need to check issues due to wrong data or understand an entity model and entity relations based on actual data. Their investigation may start with the identification of an object, with the target to find all entities, such as tables, that hold information about this object and how this object is linked to other objects. This process usually becomes a repetitive process, as the developer may find other identifications of other objects in the results and is interested in those respectively. In turn, the developer will start the same analysis for that other identification.

Current tools for exploring database content have limited capabilities. For example, current tools only allow users to explore database tables one-by-one, thereby requiring users to know in which tables the object identifications the users are exploring can be expected, as well as the details about the entity models corresponding to the object identifications.

Additionally, object identifications are typically not easily readable by humans. A common standard is to use Globally Unique Identifiers (GUIDs) r Universally Unique Identifiers (UUIDs) as identifications, which are usually represented as 32-digit hexagonal numbers. Such a character string is hard to remember and match by humans when presented on screens. The task becomes increasingly difficult for humans as more identifications of interest need to be handled at the same time. Furthermore, since entity models represent a network of objects, the data exploration process is repeated recursively. As a result of the current limitations of tools for exploring database content, users need to repeatedly navigate back and forth between user interface pages or views in order to continue exploring additional values, thereby leading to wasteful navigation and processing. Other technical challenges may arise as well.

BRIEF DESCRIPTION OF THE DRAWINGS

Some example embodiments of the present disclosure are illustrated by way of example and not limitation in the figures of the accompanying drawings, in which like reference numbers indicate similar elements.

FIG. 7 is a flowchart illustrating an example method of exploring database content by values.

FIG. 8 is a flowchart illustrating another example method of exploring database content by values.

FIG. 9 is a flowchart illustrating yet another example method of exploring database content by values.

DETAILED DESCRIPTION

Figure 1:
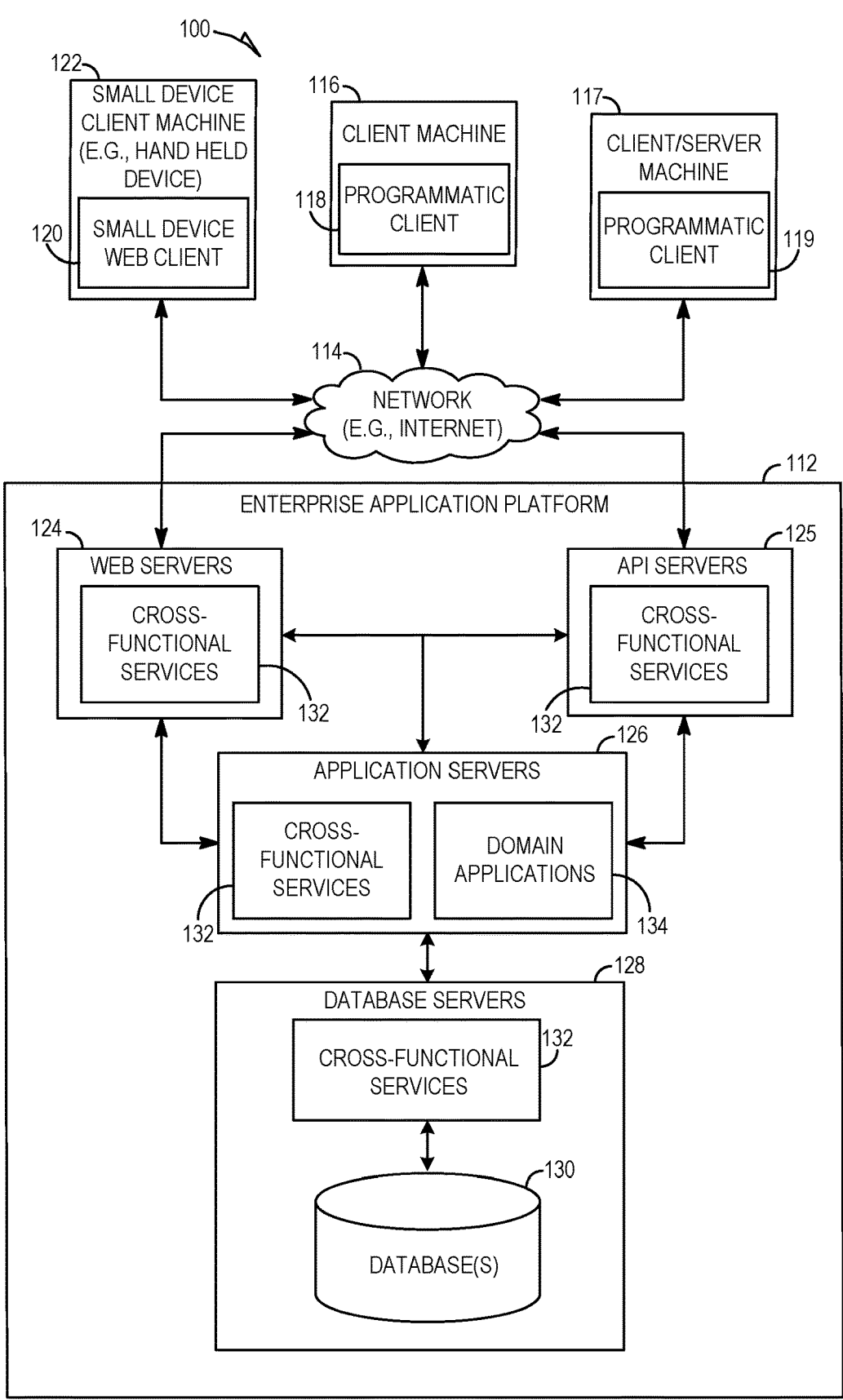
FIG. 1 is an example network diagram illustrating a system.

Example methods and systems of implementing a database value exploration system that provides an improved user interface and enables a user to efficiently explore database content are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to implement a database value exploration system that provides an improved user interface and enables a user to efficiently explore database content. In some example embodiments, a computer-implemented method may comprise receiving a first search value and generating a result set of all rows and cells of a database table found where at least one of the cell values matches the first search value. The result set may be displayed on a computing device, such as on the computing device from which the first search value was received. To support humans in identifying the searched value easily in the result set, the display of the result set may highlight the respective result cells where the value was identified. Such highlighting may include, but is not limited to, displaying a character along with the search value in the corresponding cell, such as displaying an asterisk (*) along with the search value within the cell, or applying a visual effect to the corresponding cell, such as by making a border of the corresponding cell bold, adding a background fill to the corresponding cell, or coloring the text of the corresponding cell a particular color distinct from cells that do not include the search value. Other types of highlighting of the corresponding cell are also within the scope of the present disclosure. In some example embodiments, the computer-implemented method may comprise enabling the user to directly trigger another search for one of the other cell values displayed in the result set, thereby providing the user with the ability to perform subsequent searches recursively.

By providing a user interface that enables a user to perform a search for a value and then easily trigger a subsequent search for another value found in the search results by interacting directly with the other value in the search results, the computer system disclosed herein provides a more efficient database browser by eliminating the need for the user to repetitively navigate back to the page from which the original search began to enter a new value to be searched. Furthermore, the computer system disclosed herein may enable the user to search an entire database, including each cell of all of the tables in the database, for a value and presents the user with a result of all of the tables that have at least one row in which at least one of the cells matches the value for which the search is being performed, thereby avoiding the user having to know exactly which table to search or randomly checking tables individually.

For additional support of the user, the display of the result set may be enhanced by adding special values of interest to a watch list. Values on this watch list may be assigned a unique visual highlighting effect (e.g., distinct background or font colors), which may be applied to cells having a value that matched the values on the watch list correspondingly when displaying the result set. Furthermore, the user may be assisted by an automatic retrieval of an entity type and an entity name of which the searched value or watched value may represent. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119. Other types of computing devices other than the client machine 116, the small device client machine 122, and the client/server machine 117 are also within the scope of the present disclosure and may be used to access the server-side functionality of the enterprise application platform 112 disclosed herein.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
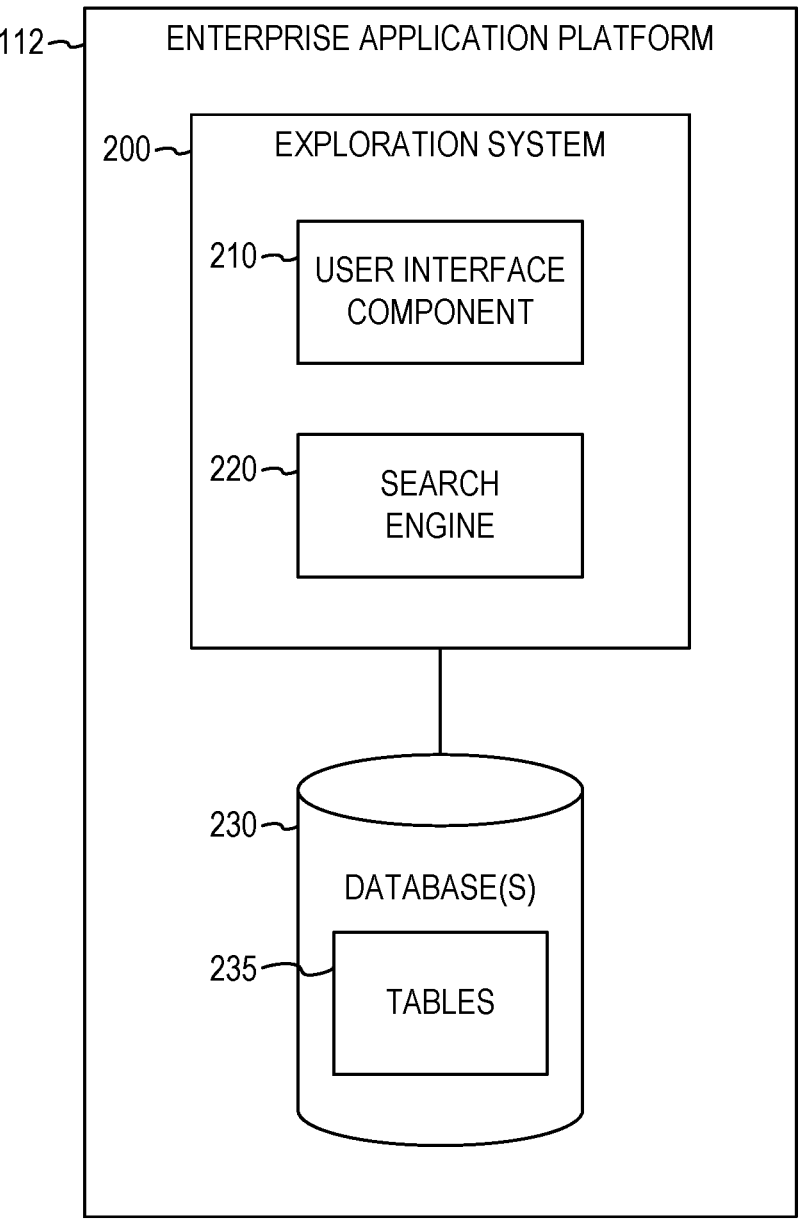
FIG. 2 is a block diagram illustrating an example exploration system.

FIG. 2 is a block diagram illustrating an example exploration system 200. The exploration system 200 may be configured to provide an improved user interface for efficiently exploring content of one or more databases 230. As will be discussed in further detail below, the exploration system 200 may provide features that include, but are not limited to, enabling a user to search each cell in all database tables 235 in a database 230 for a search value, presenting the user with a result of tables that have at least one row in which at least one of the cells matches the search value, presenting matched rows to the user and highlighting cells that include the search value to allow the user to easily identify the matched cells, enabling the user to add values of interest to a global value watch list that results in those values being highlighted in sets of search results to allow the user to easily identify values of special interest, supporting the recursive nature of the research and exploration of database content by enabling the user to easily trigger subsequent searches for other values found in the set of search results by enabling the user to define a subsequent search value via a selection of that search value directly from the set of search results, and determining supplemental data for a search, such as an entity type and a description corresponding to the search value, that may be presented to the user in easily readable, but still editable, text to assist the user in understanding the context of the values being searched and explored in the database 230.

In some example embodiments, the exploration system 200 may comprise a user interface component 210 and a search engine 220. The components shown in FIG. 2 may be configured to communicate with each other via one or more network connections, such as via the network 114 in FIG. 1 or via inter-process communication. In some example embodiments, one or more of the components of the exploration system 200 may be implemented by the enterprise application platform 112 of FIG. 1. For example, the user interface component 210 and the search engine 220 may be incorporated into the enterprise application platform 112, such as in the application servers 126. The database(s) 230 may also be incorporated into the enterprise application platform 112, such as in the database(s) 130. However, the exploration system 200 may be implemented in other ways as well.

The database 230 may comprise a plurality of database tables 235, and each database table 235 in the plurality of database tables 235 may comprise a plurality of rows. Each row in the plurality of rows may comprise a plurality of cells, and each cell in the plurality of cells of a row may store a different type of data for the row. In one example, one database table 235 may store employee information, which each row comprising a record of a different employee, and each cell in the row comprising a different type of information (e.g., identification number, name, position, location, etc.) for the specific employee corresponding to that row. Other types of database tables 235 are also within the scope of the present disclosure.

Figure 3:
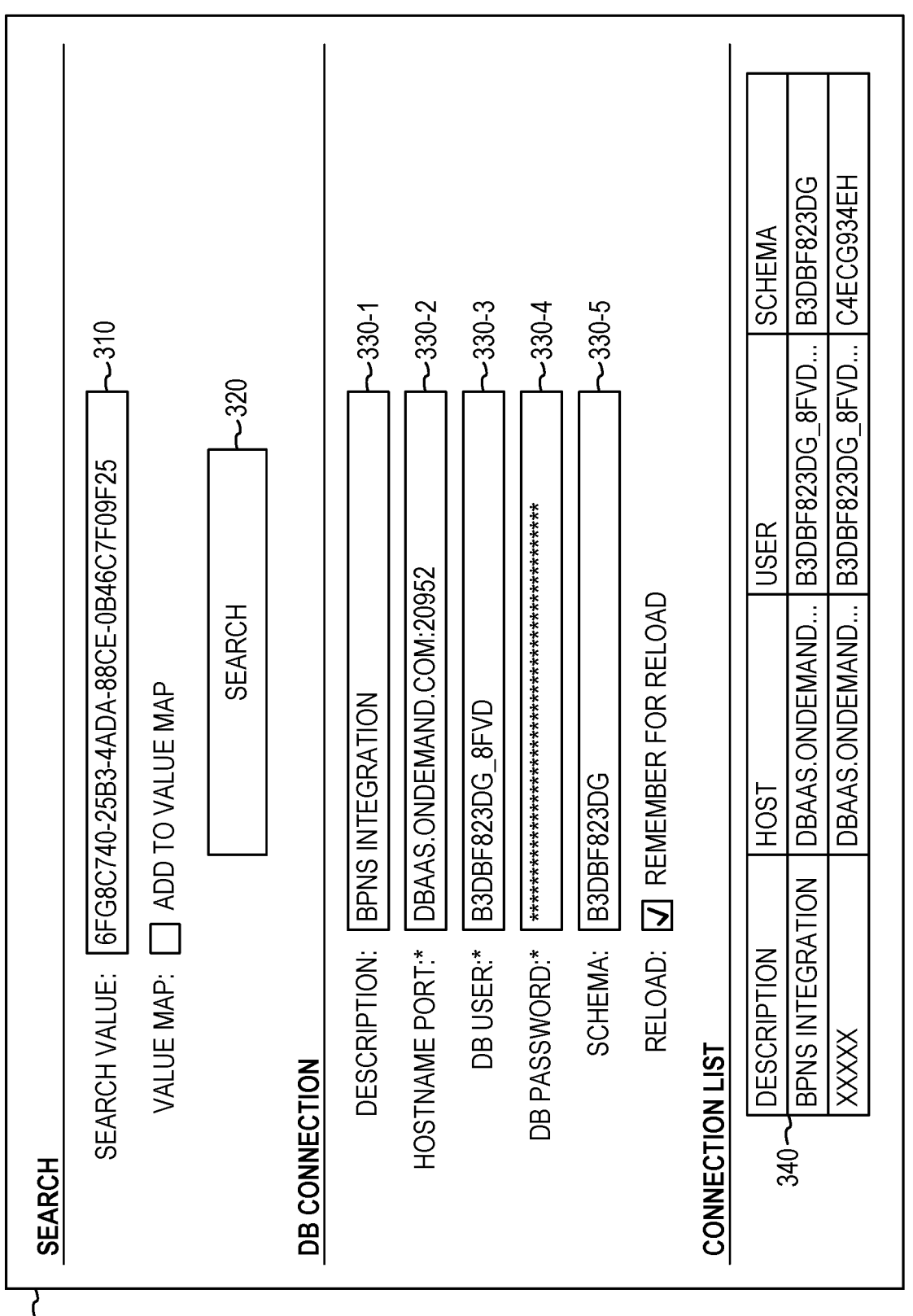
FIG. 3 illustrates a search value being received via an example graphical user interface (GUI).

In some example embodiments, the user interface component 210 may be configured to receive a first search value from a computing device of a user. For example, the user interface component 210 may receive the first search value via a search field displayed in a graphical user interface (GUI) on the computing device. FIG. 3 illustrates a search value being received via an example GUI 300. In FIG. 3, the GUI 300 comprises a search field 310 in which a user of a computing device on which the GUI 300 is displayed may enter the first search value, such as by typing, pasting, or otherwise inputting the first search value in the search field 310. Other types of user interface elements other than a search field may also be used to receive the first search value. After entering or specifying the first search value, the user may select a user interface element 320 (e.g., a "search" button) configured to submit the first search value for use as a search term in a search of the database tables 235 of the database 230.

The GUI 300 may provide other user interface elements 330 configured to receive other input from the user to configure the search. For example, the GUI 300 may include a user interface element 330-1 configured to receive a description of a database connection to use for the search. The GUI may additionally provide a list of possible database connections 340 from which the user may select (e.g., click on) to fill in the user interface element 330-1 or to directly trigger the use of this connection rather than typing the identification of the database connection. The GUI may also comprise a user interface element 330-2 configured to receive a specification of a hostname port to use for the search, a user interface element 330-3 configured to receive an identification of a database user, a user interface element 330-4 configured to receive a password, and a user interface element 330-5 configured to receive an identification of a schema. Alternatively, the database connectivity may be automatically derived from the context within which the user operates (e.g., the enterprise application platform), in which case, no user input to select the database connection is required. Other types of user interface elements configured to receive other types of data for use in the search are also within the scope of the present disclosure.

Referring back to FIG. 2, the search engine 220 may be configured to generate a first set of search results based on a first search of the plurality of database tables 235 for the first search value. For example, the search engine 220 may search through each cell of each row of each database table 235 in the plurality of database tables 235 to find the cells having data that matches the first search value. The first set of search results may identify each row of each database table 235 in the plurality of database tables 235 that has a corresponding cell that includes the first search value. In some example embodiments, the user interface component 210 may display at least a portion of the first set of search results for the first value on the computing device of the user. For example, for one of the plurality of database tables 235, the user interface component 210 may display, on the computing device, each row that is identified in the first set of search results.

Figure 4:
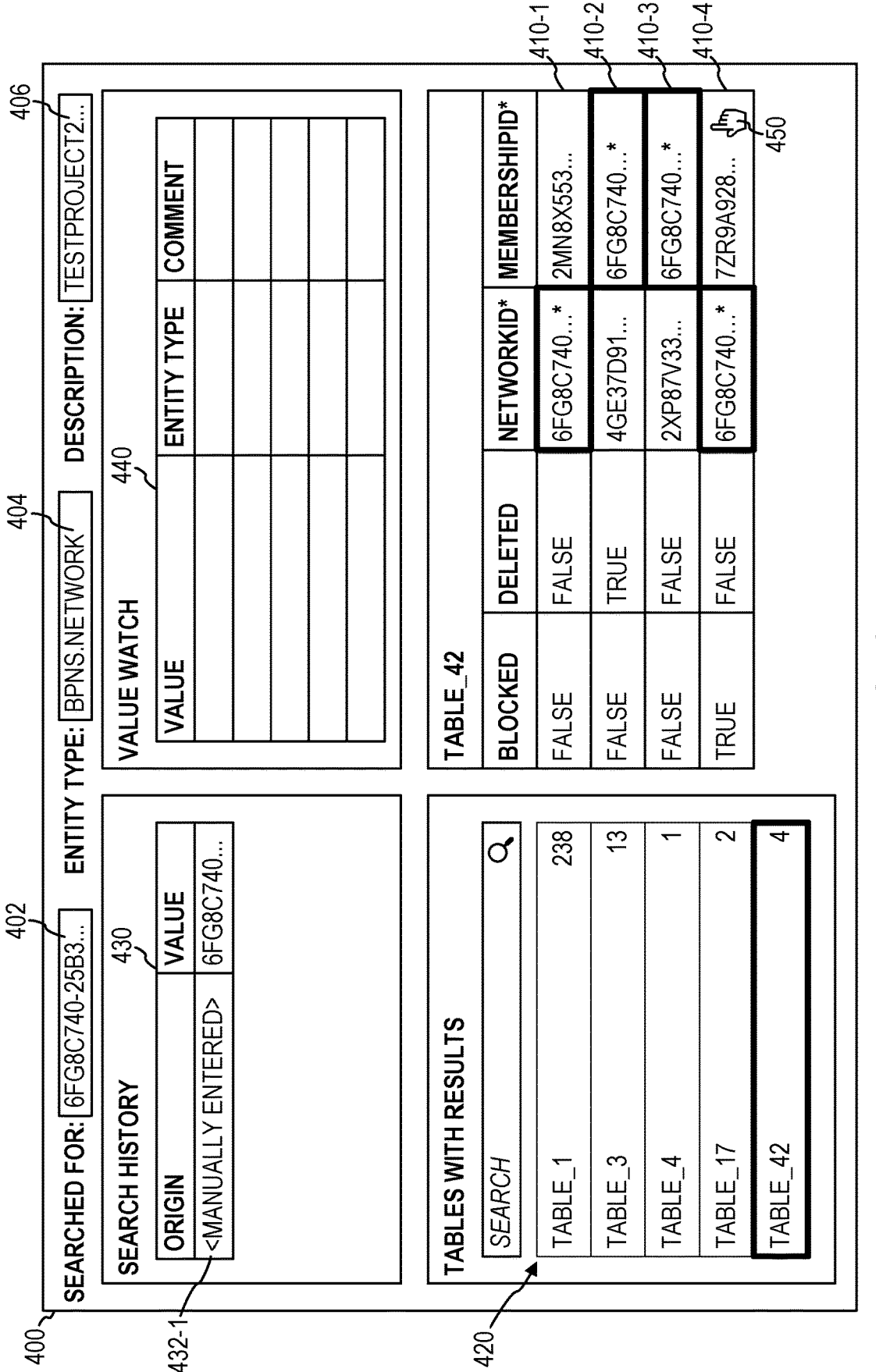
FIG. 4 illustrates a portion of a first set of search results for a first search value being displayed in an example GUI.

FIG. 4 illustrates a portion of the first set of search results for the first search value being displayed in an example GUI 400. In the GUI 400, the user has previously triggered a search for a first search value, such as by submitting the first search value for search via the GUI 300 of FIG. 3. As a result, the user interface component 210 may display, for one of the plurality of database tables 235, each row 410 that is identified in the first set of search results. For example, in the example shown in FIG. 4, the search engine 220 has found, in one of the database tables 235, four rows 410-1, 410-2, 410-3, and 410-4 that each have at least one cell that includes the first search value, and the user interface component 210 has displayed these four rows 410-1, 410-2, 410-3, and 410-4 within the GUI 400 on the computing device of the user.

Since the first set of search results may comprise results from multiple different database tables 235, the user inter-face component 210 may display a list 420 of each database table 235 in the plurality of database tables 235 that comprises a row that is identified in the first set of search results, and enable the user to select one of the database tables 235 included in the list 420. In response to receiving a user selection of one of the database tables 235 from the list 420, user interface component 210 may display the rows of the selected database table 235 that have cells that include the first search value. For example, in FIG. 4, the user has selected "TABLE_42" from the list 420, and, in response to the user selection, the user interface component 210 has displayed the corresponding rows 410 of "TABLE_42" that have cells that match the first search value.

In some example embodiments, the displaying of each row 410 comprises displaying a corresponding cell value that is stored in each one of the plurality of cells of the row 410. For example, in FIG. 4, the GUI 400 includes a display of the values of four different cells of each row 410, such as a flag value for a field labeled "BLOCKED," a flag value for a field labeled "DELETED," a network identification, and a membership identification. Other types and configurations of cells and cell values are also within the scope of the present disclosure.

For each row of a database table 235 that is identified in the set of search results, the user interface component 210 may highlight the corresponding cell that includes the search value. The highlighting of the corresponding cell may comprise displaying a character along with the search value in the corresponding cell, such as displaying an asterisk (*) along with the search value within the cell (as shown in FIG. 4), or applying a visual effect to the corresponding cell, such as by making a border of the corresponding cell bold (as shown in FIG. 4), adding a background fill to the corresponding cell, or coloring the text of the corresponding cell a particular color distinct from cells that do not include the search value. Other types of highlighting of the corresponding cell are also within the scope of the present disclosure.

The user interface component 210 may display the details of the most recent search or the search for which search results are being displayed. For example, the user interface component 210 may display the search value 402, a corresponding entity type 404 of the search value 402, and a corresponding description 406 of the search value 402. In some example embodiments, the user interface component 210 may be configured to determine some of these details and display them to the user to provide the user with additional context for the search value 402. For example, the user interface component 210 may determine the entity type 404 and a description 406 corresponding to the search value 402, such as analyzing the database table 235 or database tables 235 in which the search value 402 was found. In one example, if the user interface component 210 finds the search value 402 in a field that is a key for a database table 235, then the user interface component 210 may determine that the entity type 404 of the search value 402 is the name or identification of the database table 235 based on the search value 402 being found in the field that is the key for that database table 235. Additionally, the user interface component 210 may identify a field with one or more particular labels that are usually used for describing entities, such as "description," "label," "name," or similar and use the data in that field as the description 406 for the search value 402.

In some example embodiments, the user interface component 210 may be configured to receive, from the computing device of the user, another search value defined by a user selection of one of the displayed cell values of the rows 410.

Figure 5:
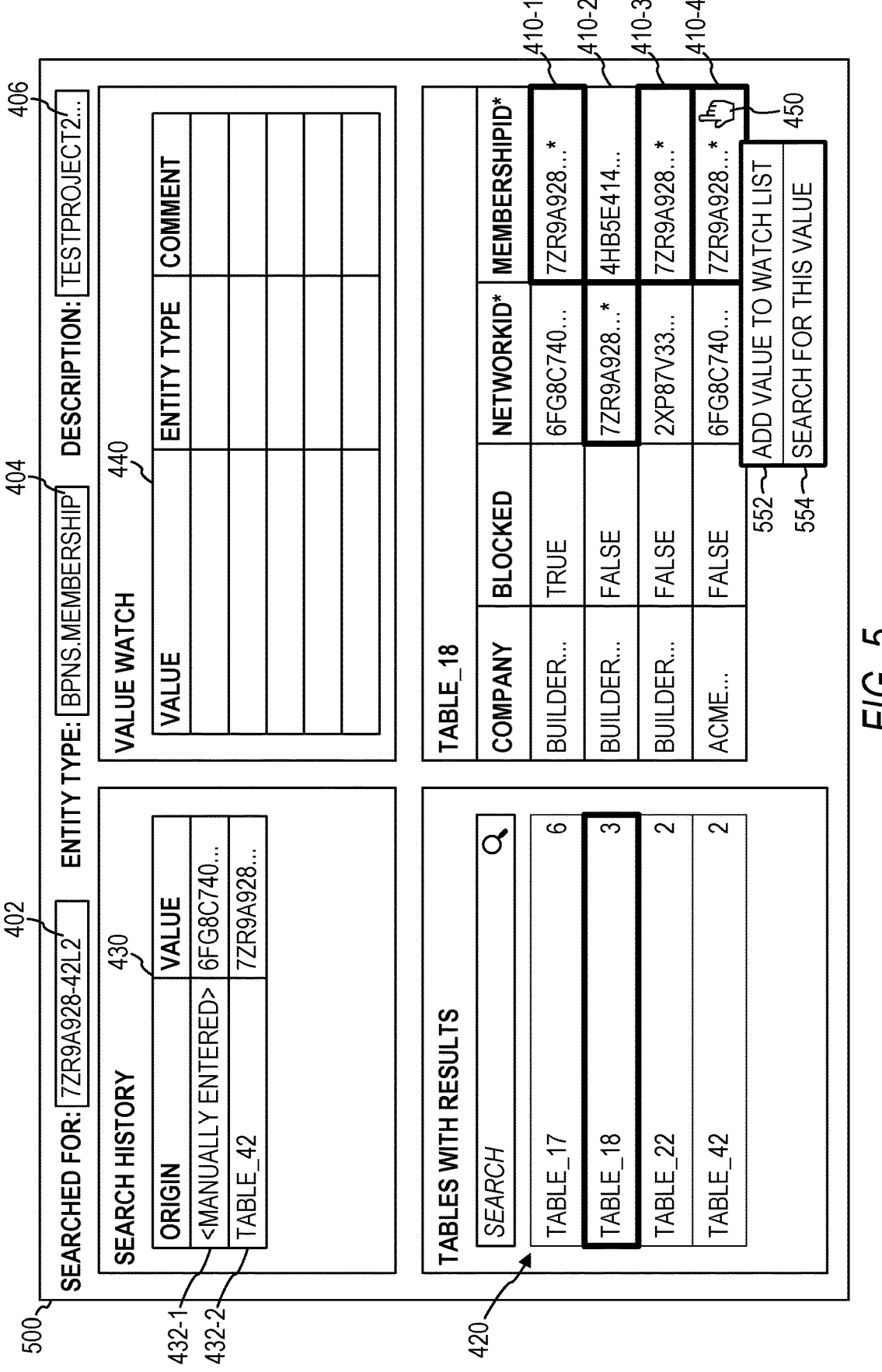
FIG. 5 illustrates a portion of a second set of search results for a second search value defined by a user selection of a cell value displayed in the first set of search results being displayed in an example GUI.

The other search value may be different from the first search value that began the exploration process and may comprise the selected one of the displayed cell values. For example, in FIG. 4, the user may select the value for the membership identification field of row 410-4, such as by double-clicking on the value using a cursor 450. Other ways of enabling the user to select the value are also within the scope of the present disclosure. In response to receiving the other search value, the search engine 220 may generate another set of search results based on another search of the plurality of database tables 235 for the other search value. The user interface component 210 may then display this other set of search results for this other search on the computing device. FIG. 5 illustrates a portion of a second set of search results for a second search value defined by a user selection of a cell value displayed in the first set of search results being displayed in an example GUI 500. In the example shown in FIG. 5, the user has just selected the value for the membership identification field of row 410-4 by double-clicking on the value using the cursor 450 in FIG. 4. As a result, the list 420 of database tables 235 and the set of search results have been updated to reflect the subsequent search triggered by the user selection of the value from the set of search results displayed in FIG. 4.

In some example embodiments, the user interface component 210 may display, on the computing device, a search history 430 identifying searches 432 that have been performed within the same session. For example, the user interface component 210 may update the display of the search history 430 to include or otherwise reflect the most recently performed search. For example, in FIG. 4, the search history 430 includes an identification of the initial search 432-1 that was performed based on the search value that was manually entered (e.g., typed) into the search field 310 in FIG. 3. In FIG. 5, the search history 430 has been updated to include an identification of the subsequent search 432-2 that was triggered based on the user selection of one of the values that was displayed as part of the search results in FIG. 4. The search history 430 may include an indication of from where each search originated, such as being manually entered by the user or selected from search results corresponding to a particular table, as well as the corresponding search value of the search. The user interface component 210 may be configured to enable the user to select any of the identifications of the searches 432 included in the displayed search history 430 to display the search results corresponding to the selected search again. For example, in FIG. 5, the user may select the identification of the first search 432-1 to trigger a display of the set of search results corresponding to the first search 432-1.

The user interface component 210 may also be configured to enable the user to add values of interest to a watch list 440. For example, the user interface component 210 may receive, from the computing device, a user selection to add a value to the watch list 440. The user interface component 210 may add the value to the watch list 440 based on the user selection and then highlight the value in any search results that are displayed. The highlighting of the value may comprise applying a visual effect to the display of the value in the corresponding cell in the search results. The visual effect may be assigned exclusively to value, such that each value in the watch list 440 has its own dedicated corresponding visual effect to help distinguish any instance of that value in the search results from other values in the search results, including other watch list values in the search results. For example, a first value in the watch list 440 may be assigned a visual effect of filling in the background of the cell with a first color (e.g., red), while a second value in the watch list 440 may be assigned a visual effect of filling in the background of the cell with a second color (e.g., blue). Although the applying of the visual effect may comprise adding a background fill to the corresponding cell, where the background fill comprises a color that has been assigned exclusively to the value, other types of highlighting are also within the scope of the present disclosure.

Figure 6:
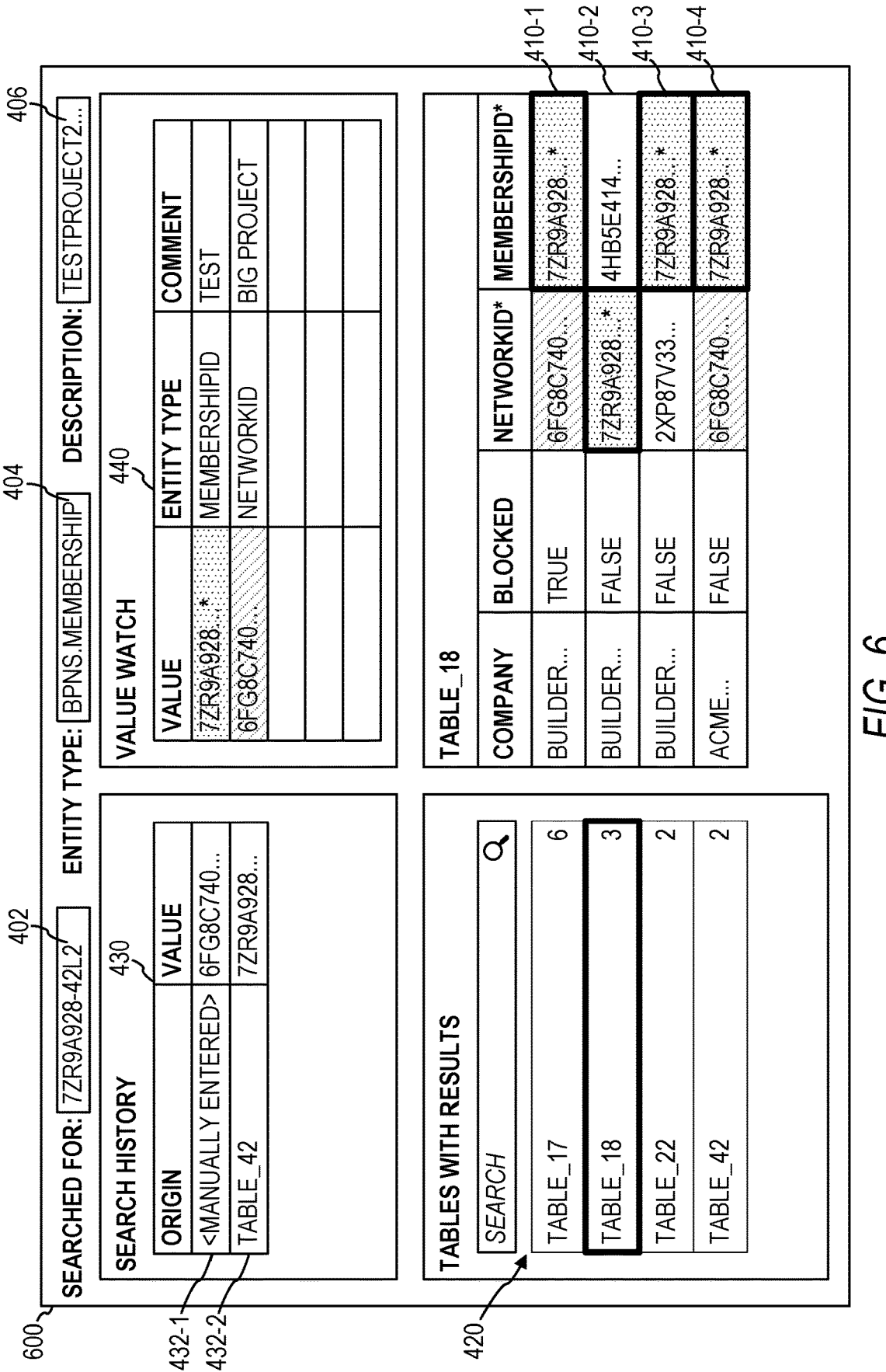
FIG. 6 illustrates an example GUI subsequent to the second search value having been added to a watch list via a user selection.

FIG. 6 illustrates an example GUI 600 subsequent to a value having been added to the watch list 440 via a user selection. For example, in FIG. 5, the user may right-click the value in the membership identification cell of the fourth row 410-4 in the set of search results, which may trigger a display of a selectable option 552 to add the value to the watch list 440. The right-click action may also trigger a display of another selectable option 554 to trigger a subsequent search of the value using the value to the new search value. In FIG. 6, the user has selected to add the value in the membership identification cell of the fourth row 410-4 in the set of search results shown in FIG. 5 to the watch list 440, thereby resulting in the value being added to the watch list 440 in FIG. 6. As a result of the value being added to the watch list 440, the value is highlighted in the set of search results in FIG. 6 with a corresponding background fill of all of the cells in which the value is present in the set of search results.

The user may add more than one value to the watch list 440 via user selection. For example, in FIG. 6, the user has additionally selected to add the value in the network identification cell of the first row 410-1 in the set of search results shown in FIG. 5 to the watch list 440, thereby resulting in the value being added to the watch list in FIG. 6. As a result of this additional value being added to the watch list 440, the additional value is also highlighted in the set of search results in FIG. 6 with a corresponding background fill of all of the cells in which the additional value is present in the set of search results. Each watch list entry may be highlighted differently in the result set to allow for easy identification and distinction, such as a first type of background fill being used for a first value of the watch list 440 and a second type of background fill being used for a second value of the watch list 440, as shown in FIG. 6. In addition to or as an alternative to using a background fill to highlight watch list values present in the set of search results, other ways of highlighting the watch list values are also within the scope of the present disclosure.

FIG. 7 is a flowchart illustrating an example method 700 of exploring database content by values. The method 700 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 700 are performed by the exploration system 200 of FIG. 2 or any combination of one or more of its components (e.g., the user interface component 210, the search engine 220).

At operation 710, the exploration system 200 may receive a first search value from a computing device of a user. For example, the exploration system 200 may receive the first search value via a search field displayed in a GUI on the computing device, such as via the search field 310, as shown in FIG. 3. However, other types of user interface elements may be used to obtain the first search value from the user.

Next, the exploration system 200 may, at operation 720, generate a first set of search results based on a first search of a plurality of database tables 235 for the first search value.

Each database table 235 in the plurality of database tables 235 may comprise a plurality of rows, and each row in the plurality of rows may comprise a plurality of cells. The first set of search results may identify each row of each database table 235 in the plurality of database tables 235 that has a corresponding cell that includes the first search value.

Additionally, at operation 720, the exploration system 200 may determine one or more details of the first search value, such as a corresponding entity type of the first search value and a corresponding description of the first search value, as previously discussed with respect to FIG. 4. For example, the exploration system 200 may identify a probable entity type of the instance that the first search value uniquely identifies, such as by identifying rows where the first search value is the unique key of that row and using the table name of the table in which that row is located as the corresponding entity type of the first search value. The exploration system 200 may also check those rows to determine if any known column names are present which likely contain descriptive text or names of the instances of the object represented by the first search value.

The exploration system 200 may then, for one of the plurality of database tables 235, cause each row of the one of the plurality of database tables 235 that is identified in the first set of search results to be displayed on the computing device, at operation 730. The displaying of each row may comprise displaying a corresponding cell value that is stored in each one of the plurality of cells of the row, such as shown in the GUI 400 of FIG. 4. The exploration system 200 may also cause the one or more details of the first search value that may be determined at operation 720, such as the corresponding entity type of the first search value and the corresponding description of the first search value, to be displayed as well, as previously discussed with respect to FIG. 4

In some example embodiments, the displaying of each row of the one of the plurality of database tables 235 that is identified in the first set of search results may further comprise, for each row that is identified in the first set of search results, highlighting the corresponding cell that includes the first search value, such as shown in the GUI 400 of FIG. 4. The exploration system 200 may highlight the corresponding cell by using any technique to visually distinguish the cell from all of the other displayed cells that do not include the first search value. For example, the highlighting of the corresponding cell may comprise displaying a character along with the first search value in the corresponding cell or applying a visual effect to the corresponding cell, where the applying of the visual effect comprising making a border of the corresponding cell bold or adding a background fill to the corresponding cell. However, other techniques for highlighting the cell are also within the scope of the present disclosure.

In some example embodiments, the displaying of each row of the one of the plurality of database tables 235 that is identified in the first set of search results comprises displaying a list 420 of each database table 235 in the plurality of database tables 235 that comprises a row that is identified in the first set of search results, such as shown in the GUI 400 of FIG. 4. The displaying of the list 420 may comprise displaying, for each database table 235 in the list 420, a count of rows in the database table 235 that has a corresponding cell that includes the first search value. The exploration system 200 may receive, from the computing device, another user selection of the one of the plurality of database tables 235 in the list 420. The displaying of each row of one of the plurality of database tables 235 that is identified in the first set of search results may be performed in response to the other user selection of the one of the plurality of database tables 235 in the list 420.

Next, at operation 740, the exploration system 200 may receive, from the computing device, another search value defined by a user selection of one of the displayed cell values. The other search value may be different from the first search value received at operation 710 and may comprise the selected one of the displayed cell values. In some example embodiments, the user selection of the one of the displayed cell values may comprise a double-click of the one of the displayed cell values. However, the user selection of the one of the displayed cell values may comprise other types of user selections as well.

The exploration system 200 may then, at operation 750, generate a second set of search results based on a second search of the plurality of database tables 235 for the second search value in response to receiving the second search value. The second set of search results may identify each row of each database table 235 in the plurality of database tables 235 that has a corresponding cell that includes the second search value.

Next, the exploration system 200 may, for another one of the plurality of database tables 235, display, on the computing device, each row of the other one of the plurality of database tables 235 that is identified in the second set of search results, at operation 760. The displaying of each row of the other one of the plurality of database tables 235 may comprise displaying a corresponding cell value that is stored in each one of the plurality of cells of the row, such as shown in the GUI 500 of FIG. 5.

In some example embodiments, the displaying of each row of the other one of the plurality of database tables 235 that is identified in the second set of search results may further comprise, for each row that is identified in the second set of search results, highlighting the corresponding cell that includes the second search value, such as shown in the GUI 500 of FIG. 5. The exploration system 200 may highlight the corresponding cell by using any technique to visually distinguish the cell from all of the other displayed cells that do not include the second search value. For example, the highlighting of the corresponding cell may comprise displaying a character along with the second search value in the corresponding cell or applying a visual effect to the corresponding cell, where the applying of the visual effect comprising making a border of the corresponding cell bold or adding a background fill to the corresponding cell. However, other techniques for highlighting the cell are also within the scope of the present disclosure.

The method 700 may then return to operation 740, where the exploration system 200 may receive another search value defined by another user selection of one of the cell values displayed at operation 760. Here, the method 700 may repeat the operations 740, 750, and 760 for as many times as the user selects another value included in the search results to search and explore, thereby facilitating a recursive research process.

It is contemplated that any of the other features described within the present disclosure can be incorporated into the method 700.

FIG. 8 is a flowchart illustrating another example method 800 of exploring database content by values. The method 800 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 800 are performed by the exploration system 200 of FIG. 2 or any combination of one or more of its components (e.g., the user interface component 210, the search engine 220).

The method 800 may include operations 832 and 834 being performed prior to one or more of operations 740, 750, or 760 of the method 700. At operation 832, the exploration system 200 may, prior to the receiving of the other search value at operation 740 or the displaying of each row of the other one of the plurality of database tables 235 that is identified in the second set of search results at operation 760, receive, from the computing device, another user selection to add a value of interest to a watch list. For example, the user may select to add the second search value to the watch list. However, other values may be selected by the user to add as a value of interest to the watch list. The exploration system 200 may then cause the value of interest displayed in each row of the first set of search results to be highlighted based on the user selection to add the value of interest to the watch list.

In some example embodiments, the displaying of each row of the other one of the plurality of database tables 235 that is identified in the second set of search results, at operation 760, further comprises highlighting the value of interest displayed in each row of the other one of the plurality of database tables 235 that is identified in the second set of search results based on the other user selection to add the value of interest to the watch list, such as shown in the GUI 600 of FIG. 6. The highlighting of the value of interest may comprise applying a visual effect to the display of the value of interest in the corresponding cell, where the visual effect is assigned exclusively to the value of interest. The applying of the visual effect may comprise adding a background fill to the corresponding cell, where the background fill comprises a color that has been assigned exclusively to the value of interest. However, other types of highlighting are also within the scope of the present disclosure.

It is contemplated that any of the other features described within the present disclosure can be incorporated into the method 800.

FIG. 9 is a flowchart illustrating yet another example method 900 of exploring database content by values. The method 900 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 900 are performed by the exploration system 200 of FIG. 2 or any combination of one or more of its components (e.g., the user interface component 210, the search engine 220).

The method 900 may include operation 935 being performed prior to one or more of operations 740, 750, or 760 of the method 700. For example, at operation 935, the exploration system 200 may display, on the computing device, a search history identifying the first search for the first search value and the second search for the second search value. The exploration system 200 may update the display of the search history to include or otherwise reflect the most recently performed search, such as shown in FIGS. 4 and 5. The user may select any of the searches included in the displayed search history to display the search results corresponding to the selected search again.

It is contemplated that any of the other features described within the present disclosure can be incorporated into the method 900.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: receiving a first search value from a computing device; generating a first set of search results based on a first search of a plurality of database tables for the first search value, each database table in the plurality of database tables comprising a plurality of rows, each row in the plurality of rows comprising a plurality of cells, the first set of search results identifying each row of each database table in the plurality of database tables that has a corresponding cell that includes the first search value; for one of the plurality of database tables, causing each row of the one of the plurality of database tables that is identified in the first set of search results to be displayed on the computing device, a corresponding cell value that is stored in each one of the plurality of cells of the row being displayed; receiving, from the computing device, a second search value defined by a user selection of one of the displayed cell values, the second search value being different from the first search value; and in response to receiving the second search value, generating a second set of search results based on a second search of the plurality of database tables for the second search value, the second set of search results identifying each row of each database table in the plurality of database tables that has a corresponding cell that includes the second search value.

Example 2 includes the computer-implemented method of example 1, further comprising: for another one of the plurality of database tables, displaying, on the computing device, each row of the other one of the plurality of database tables that is identified in the second set of search results, the displaying of each row of the other one of the plurality of database tables comprising displaying a corresponding cell value that is stored in each one of the plurality of cells of the row.

Example 3 includes the computer-implemented method of example 1 or example 2, further comprising: prior to the displaying of each row of the other one of the plurality of database tables that is identified in the second set of search results, receiving, from the computing device, another user selection to add a value of interest to a watch list, wherein the displaying of each row of the other one of the plurality of database tables that is identified in the second set of search results further comprises highlighting the value of interest displayed in each row of the other one of the plurality of database tables that is identified in the second set of search results based on the other user selection to add the value of interest to the watch list.

Example 4 includes the computer-implemented method of any one of examples 1 to 3, wherein the highlighting of the value of interest comprises applying a visual effect to the display of the value of interest in the corresponding cell, the visual effect being assigned exclusively to the value of interest.

Example 5 includes the computer-implemented method of any one of examples 1 to 4, wherein the applying of the visual effect comprises adding a background fill to the corresponding cell, the background fill comprising a color that has been assigned exclusively to the value of interest.

Example 6 includes the computer-implemented method of any one of examples 1 to 5, wherein the user selection of the one of the displayed cell values comprises a double-click of the one of the displayed cell values.

Example 7 includes the computer-implemented method of any one of examples 1 to 6, further comprising: displaying, on the computing device, a search history identifying the first search for the first search value and the second search for the second search value.

Example 8 includes the computer-implemented method of any one of examples 1 to 7, wherein the displaying of each row of the one of the plurality of database tables that is identified in the first set of search results further comprises: for each row of the one of the plurality of database tables that is identified in the first set of search results, highlighting the corresponding cell that includes the first search value.

Example 9 includes the computer-implemented method of any one of examples 1 to 8, wherein the highlighting of the corresponding cell comprises displaying a character along with the first search value in the corresponding cell.

Example 10 includes the computer-implemented method of any one of examples 1 to 9, wherein the highlighting of the corresponding cell comprises applying a visual effect to the corresponding cell, the applying of the visual effect comprising making a border of the corresponding cell bold or adding a background fill to the corresponding cell.

Example 11 includes the computer-implemented method of any one of examples 1 to 10, wherein the displaying of each row of the one of the plurality of database tables that is identified in the first set of search results comprises: displaying a list of each database table in the plurality of database tables that comprises a row that is identified in the first set of search results, the list comprising the one of the plurality of database tables, the displaying of the list comprising displaying, for each database table in the list, a count of rows in the database table that has a corresponding cell that includes the first search value; and receiving, from the computing device, another user selection of the one of the plurality of database tables in the list, wherein the displaying of each row of the one of the plurality of database tables that is identified in the first set of search results is performed in response to the other user selection of the one of the plurality of database tables in the list.

Example 12 includes a system comprising: at least one processor; and a non-transitory computer-readable medium storing executable instructions that, when executed, cause the at least one processor to perform the method of any one of examples 1 to 11.

Example 13 includes a non-transitory machine-readable storage medium, tangibly embodying a set of instructions that, when executed by at least one processor, causes the at least one processor to perform the method of any one of examples 1 to 11.

Example 14 includes a machine-readable medium carrying a set of instructions that, when executed by at least one processor, causes the at least one processor to carry out the method of any one of examples 1 to 11.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 10:
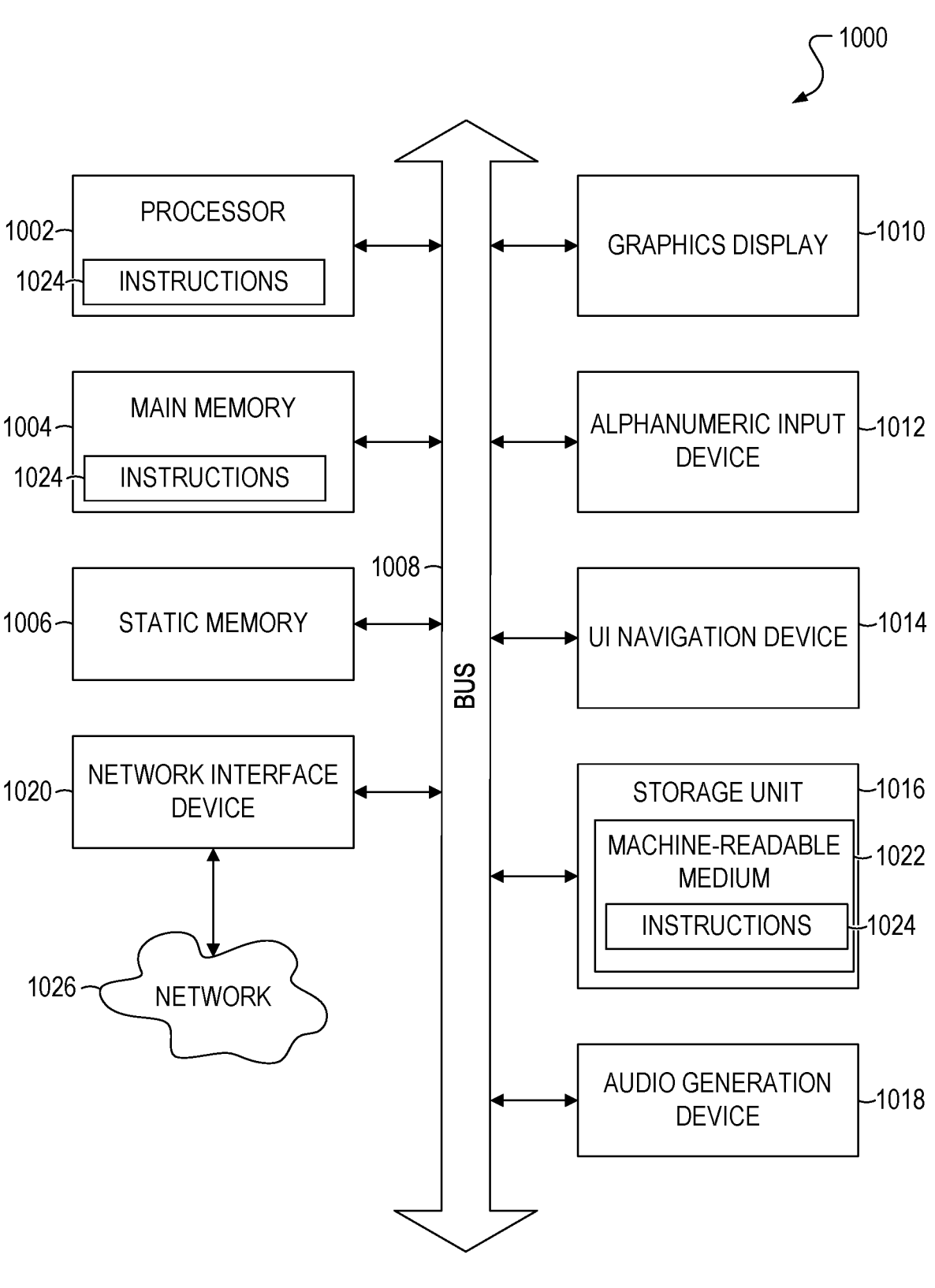
FIG. 10 is a block diagram of an example computer system on which methodologies described herein can be executed.

FIG. 10 is a block diagram of a machine in the example form of a computer system 1000 within which instructions 1024 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004, and a static memory 1006, which communicate with each other via a bus 1008. The computer system 1000 may further include a graphics or video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a storage unit (e.g., a disk drive unit) 1016, an audio or signal generation device 1018 (e.g., a speaker), and a network interface device 1020.

The storage unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method comprising:
    receiving a first search value from a computing device;
    generating a first set of search results based on a first
        search of a plurality of database tables for the first
        search value, each database table in the plurality of
        database tables comprising a plurality of rows, each row in the plurality of rows comprising a plurality of cells, the first set of search results identifying each row of each database table in the plurality of database tables that has a corresponding cell that includes the first search value, each database table stored in a relational database;

for one of the plurality of database tables, causing each row, of the one of the plurality of database tables, that is identified in the first set of search results, including cell values that do not contain the first search value, to be displayed on the computing device and causing each cell value that contains the first search value to be displayed with a first visual indication corresponding to the first search value;

subsequent to the causing, receiving, from the computing device, a second search value defined by a user selection of one of the displayed cell values, the second search value being different from the first search value;

in response to receiving the second search value, generating a second set of search results based on a second search of the plurality of database tables for the second search value, the second set of search results identifying each row of each database table in the plurality of database tables that has a corresponding cell that includes the second search value; and for the one of the plurality of database tables, causing each row, of the one of the plurality of database tables, that is identified in the second set of search results, including cell values that do not contain the second search value, to be displayed on the computing device and causing each cell value that contains the second search value to be displayed with a second visual indication corresponding to the second search value, the first visual indication and the second visual indication being displayed concurrently on the computing device.

2. The computer-implemented method of claim 1, wherein the first visual indication is a first color and the second visual indication is a second color different than the first color.

3. The computer-implemented method of claim 2, further comprising:

prior to the receiving of the second search value, receiving, from the computing device, another user selection to add a value of interest to a watch list, wherein the second visual indication is a highlighting of the value of interest.

4. The computer-implemented method of claim 3, wherein the second visual indication is assigned exclusively to the value of interest.

5. The computer-implemented method of claim 4, wherein the second visual indication is a background fill of the corresponding cell, the background fill comprising a color that has been assigned exclusively to the value of interest.

6. The computer-implemented method of claim 1, wherein the user selection of the one of the displayed cell values comprises a double-click of the one of the displayed cell values.

7. The computer-implemented method of claim 1, further comprising:

displaying, on the computing device, a search history identifying the first search for the first search value and the second search for the second search value.

8. The computer-implemented method of claim 1, wherein the displaying of each row of the one of the plurality of database tables that is identified in the first set of search results further comprises not displaying any row of the plurality of database tables that is not identified in the first set of search results.

9. The computer-implemented method of claim 1, wherein the first visual indication is a character displayed along with the first search value in the corresponding cell.

10. The computer-implemented method of claim 1, wherein the first visual indication is a bolded border of a cell containing the first search value.

11. The computer-implemented method of claim 1, wherein the displaying of each row of the one of the plurality of database tables that is identified in the first set of search results comprises:

displaying a list of each database table in the plurality of database tables that comprises a row that is identified in the first set of search results, the list comprising the one of the plurality of database tables, the displaying of the list comprising displaying, for each database table in the list, a count of rows in the database table that has a corresponding cell that includes the first search value; and receiving, from the computing device, another user selection of the one of the plurality of database tables in the list, wherein the displaying of each row of the one of the plurality of database tables that is identified in the first set of search results is performed in response to the another user selection of the one of the plurality of database tables in the list.

12. A system of comprising:

at least one hardware processor; and a non-transitory computer-readable medium storing executable instructions that, when executed, cause the at least one hardware processor to perform computer operations comprising:

receiving a first search value from a computing device;

generating a first set of search results based on a first search of a plurality of database tables for the first search value, each database table in the plurality of database tables comprising a plurality of rows, each row in the plurality of rows comprising a plurality of cells, the first set of search results identifying each row of each database table in the plurality of database tables that has a corresponding cell that includes the first search value, each database table stored in a relational database;

for one of the plurality of database tables, causing each row, of the one of the plurality of database tables, that is identified in the first set of search results, including cell values that do not contain the first search value, to be displayed on the computing device and causing each cell value that contains the first search value to be displayed with a first visual indication corresponding to the first search value;

subsequent to the causing, receiving, from the computing device, a second search value defined by a user selection of one of the displayed cell values, the second search value being different from the first search value;

in response to receiving the second search value, generating a second set of search results based on a second search of the plurality of database tables for the second search value, the second set of search results identifying each row of each database table in the plurality of database tables that has a corresponding cell that includes the second search value; and for the one of the plurality of database tables, causing each row, of the one of the plurality of database tables, that is identified in the second set of search results, including cell values that do not contain the second search value, to be displayed on the computing device and causing each cell value that contains the second search value to be displayed with a second visual indication corresponding to the second search value, the first visual indication and the second visual indication being displayed concurrently on the computing device.

13. The system of claim 12, wherein the computer operations further comprise:

wherein the first visual indication is a first color and the second visual indication is a second color different than the first color.

14. The system of claim 13, wherein the computer operations further comprise:

prior to the receiving of the second search value, receiving, from the computing device, another user selection to add a value of interest to a watch list, wherein the second visual indication is a highlighting of the value of interest.

15. The system of claim 14, wherein the second visual indication is assigned exclusively to the value of interest.

16. The system of claim 15, wherein the second visual indication is a background fill of the corresponding cell, the background fill comprising a color that has been assigned exclusively to the value of interest.

17. The system of claim 12, wherein the user selection of the one of the displayed cell values comprises a double-click of the one of the displayed cell values.

18. The system of claim 12, wherein the computer operations further comprise:

displaying, on the computing device, a search history identifying the first search for the first search value and the second search for the second search value.

19. The system of claim 12, wherein the displaying of each row of the one of the plurality of database tables that is identified in the first set of search results further comprises not displaying any row of the plurality of database tables that is not identified in the first set of search results.

20. A non-transitory machine-readable storage medium tangibly embodying a set of instructions that, when executed by at least one hardware processor, causes the at least one processor to perform computer operations comprising:

receiving a first search value from a computing device;

generating a first set of search results based on a first search of a plurality of database tables for the first search value, each database table in the plurality of database tables comprising a plurality of rows, each row in the plurality of rows comprising a plurality of cells, the first set of search results identifying each row of each database table in the plurality of database tables that has a corresponding cell that includes the first search value, each database table stored in a relational database; receiving a first search value from a computing device;

generating a first set of search results based on a first search of a plurality of database tables for the first search value, each database table in the plurality of database tables comprising a plurality of rows, each row in the plurality of rows comprising a plurality of cells, the first set of search results identifying each row of each database table in the plurality of database tables that has a corresponding cell that includes the first search value, each database table stored in a relational database;

for one of the plurality of database tables, causing each row, of the one of the plurality of database tables, that is identified in the first set of search results, including cell values that do not contain the first search value, to be displayed on the computing device and causing each cell value that contains the first search value to be displayed with a first visual indication corresponding to the first search value;

subsequent to the causing, receiving, from the computing device, a second search value defined by a user selection of one of the displayed cell values, the second search value being different from the first search value;

in response to receiving the second search value, generating a second set of search results based on a second search of the plurality of database tables for the second search value, the second set of search results identifying each row of each database table in the plurality of database tables that has a corresponding cell that includes the second search value; and for the one of the plurality of database tables, causing each row, of the one of the plurality of database tables, that is identified in the second set of search results, including cell values that do not contain the second search value, to be displayed on the computing device and causing each cell value that contains the second search value to be displayed with a second visual indication corresponding to the second search value, the first visual indication and the second visual indication being displayed concurrently on the computing device.

\* \* \* \* \*